United States Patent Office 2,772,409
Patented Nov. 27, 1956

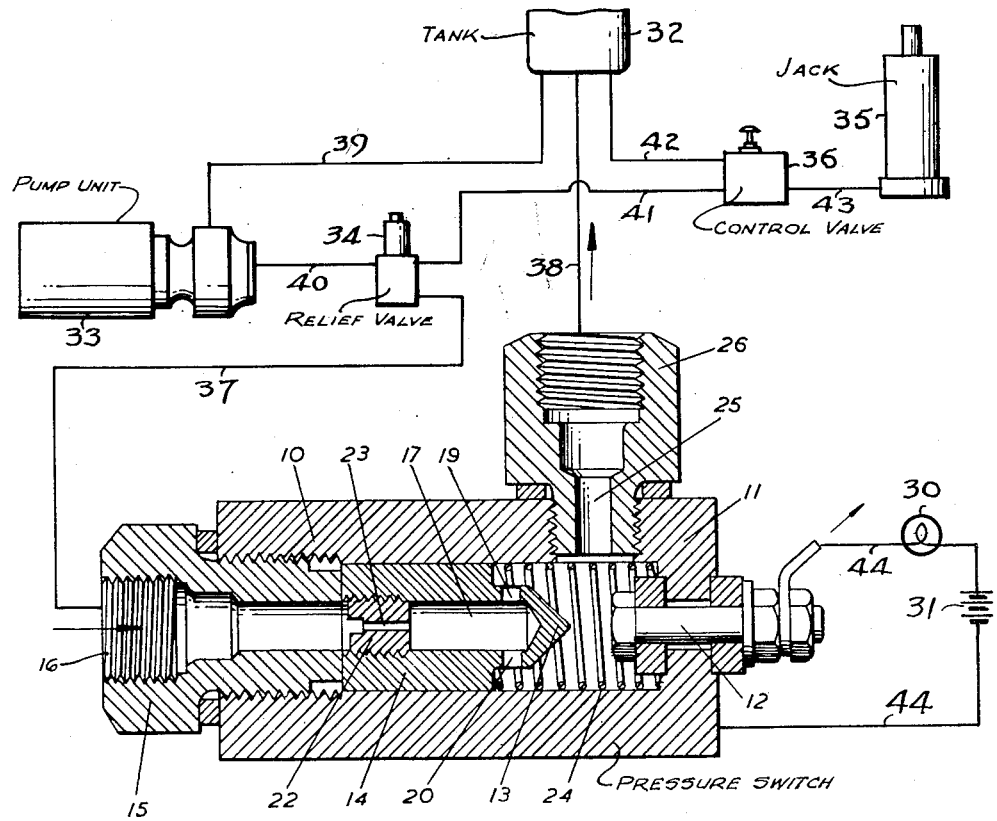

2,772,409
PRESSURE RESPONSIVE FLOW INDICATOR

Kenneth Eric Reid, London, England, assignor to Smiths Jacking Systems Limited, London, England Application January 21, 1953, Serial No. 332,332

Claims priority, application Great Britain January 22, 1952

6 Claims. (Cl. 340—239)

This invention relates to hydraulic systems.

In hydraulic systems, it is sometimes necessary to indicate to the operator that the operating cycle is complete and this is especially so in systems in which the hydraulic pressure, in order to complete the operation, has to rise to its maximum permissible extent.

I have found that the use of a normal pressure gauge for this purpose is unreliable.

According to the present invention a device is provided for use between a relief valve and an outlet pipe, which device comprises a housing containing a movable plug, fluid inlet and outlet openings in the housing at opposite ends of the plug, means urging the plug resiliently in one direction, means to operate a warning device when the plug is moved in the opposite direction, and a conduit through the plug and/or between the plug and the housing, the conduit being of such restricted cross-sectional size that a pressure is developed for moving the plug in said opposite direction. The plug may have a definite and sufficient movement to ensure reliable operation e. g. one sixteenth of an inch to one half of an inch. The plug may be in the form of a slidable piston and may contact part of an electric warning device to operate it e. g. by grounding the circuit.

A constructional form of the invention will now be described by way of example with reference to the accompanying drawing which is a sectional view of a device made in accordance with the invention.

A housing 10 is of open construction at one end and has an end wall 11 at the other end. The end wall has a central hole through which passes a bolt 12 the outer end of which is connected to an electric lamp 30 and to a source of electric current supply 31 and the inner end of which is adapted to be contacted by the pointed end 13 of a piston or slidable plug 14 that has a sliding fit in the housing. The end of the housing opposite to the bolt 12 has an inlet duct 16 formed by a pipe connector 15 screwed into the housing which fits on to a pipe line leading from a relief valve 34. The piston has a central bore 17 through the non-pointed end communicating with cross-bores 19, 20 near the pointed end where the piston is of reduced diameter. Threaded into the central bore is a small block 22 having a small duct 23 through it. Between the shoulder formed by the reduced diameter of the piston and the bolt end of the sleeve, is a helical spring 24 which urges the piston towards said connector 15. Between the pointed end of the piston and the bolt, the housing is formed with an outlet duct 25 formed by a threaded outlet pipe connector 26 leading to a tank 32 from which a pump 33 draws oil or other liquid which it supplies to the system. When the relief valve 34 opens, the liquid therefrom flows through the inlet duct 16, small duct 23, central bore 17, cross bores 19—20, and outlet opening 25. Inasmuch as the duct 23 is small in cross section, a pressure difference is effected on opposite sides of block 22 due to this fluid flow, which pressure difference moves the piston against the action of the spring 24 until the pointed end 13 contacts the bolt 12 and grounds the electric circuit so that the electric lamp 30 is operated to provide a warning light.

Although the figure shows the warning device in combination with a jack 35 provided with a control valve 36, it will be understood that these elements are illustrative and are not to be taken as limiting in any sense. Fluid conduits or pipes are indicated by the numerals 37–43 inclusive. The warning light circuit comprises wire 44.

I claim:

1. In combination, an hydraulic apparatus having a pump, an output line from the pump and a relief valve connected to the output line, an hydraulic indicating device comprising a housing containing a movable plug, fluid inlet and outlet openings in the housing at opposite ends of the said plug, means urging the plug resiliently in one direction, means to operate a warning device when the plug is moved in the opposite direction, a conduit through the plug and/or between the plug and the housing whereby a permanently open passage is provided for fluid flow at all times, the said conduit being of restricted cross-sectional size whereby a pressure differential is developed which fluid flows through said conduit, said pressure differential moving the plug in said opposite direction.

2. A device as claimed in claim 1 wherein the plug is in the form of a slidable piston, said piston serving to contact part of an electric warning device when moved in said opposite direction thereby to operate the said warning device.

3. A device as claimed in claim 2 wherein the said plug fits the said housing at one portion thereof, said plug being of reduced section at the end thereof where it contacts said warning device part, said reduced section portion defining a transverse opening communicating with an axial bore, said opening and bore comprising said conduit.

4. A device as claimed in claim 1 wherein the said conduit contains a removable block having a duct therein, said duct determining the effective size of the conduit.

5. A device as claimed in claim 4 wherein the said means urging the plug is a helical spring which urges the plug towards the said inlet opening.

6. A hydraulic apparatus having a device as claimed in claim 1 connected with the said inlet in communication with said relief valve and the outlet in communication with a liquid supply tank.

References Cited in the file of this patent

UNITED STATES PATENTS

| 1,306,154 | Leitman | June 10, 1919 |
| 2,332,301 | Cox | Oct. 19, 1943 |
| 2,348,651 | Schelly | May 9, 1944 |
| 2,392,581 | Juhasz | Jan. 8, 1946 |
| 2,468,768 | Malick | May 3, 1949 |
| 2,497,375 | Sequin et al. | Feb. 14, 1950 |
| 2,629,089 | Fairbairn et al. | Feb. 17, 1953 |